United States Patent [19]
Daitch

[11] Patent Number: 5,387,037
[45] Date of Patent: Feb. 7, 1995

[54] COUPON ORGANIZER

[76] Inventor: Beverly Daitch, 29145 Forest Hill Ct., Farmington Hills, Mich. 48331

[21] Appl. No.: 96,016

[22] Filed: Jul. 22, 1993

[51] Int. Cl.⁶ .................. B65D 30/20; B65D 30/22; B65D 33/14
[52] U.S. Cl. ................................ 383/7; 150/112; 224/42.11; 383/38
[58] Field of Search .............. 280/DIG. 4; 383/7, 38, 383/39; 229/72, 1.5 R; 150/147, 112; 224/42.11, 277

[56] References Cited

U.S. PATENT DOCUMENTS

| | | | |
|---|---|---|---|
| 1,202,069 | 10/1916 | Kantro | 229/72 |
| 1,871,549 | 8/1932 | Miller | 383/38 |
| 1,885,736 | 11/1932 | L'Enfant | 383/38 |
| 2,416,816 | 3/1947 | Compagnano | 229/72 |
| 2,887,216 | 5/1959 | Hargraves | 224/277 |
| 2,979,098 | 4/1961 | Greaves | 224/42.11 |
| 3,023,948 | 3/1962 | Hoeppner | 383/7 |
| 3,125,145 | 3/1964 | Williams | 383/7 |
| 3,370,629 | 2/1968 | Neuman | 383/7 |
| 4,274,567 | 6/1981 | Sawyer . | |
| 4,512,504 | 4/1985 | Owlett . | |
| 4,685,570 | 8/1987 | Medow | 383/39 |
| 4,730,727 | 3/1988 | Petroff . | |
| 4,938,402 | 7/1990 | Anatra et al. . | |
| 4,955,516 | 9/1990 | Satterfield . | |
| 4,964,508 | 10/1990 | Balsley . | |
| 4,966,318 | 10/1990 | Dutka . | |
| 5,038,986 | 8/1991 | Beauchesne . | |
| 5,048,736 | 9/1991 | Anatra . | |
| 5,170,889 | 12/1992 | Cue . | |

Primary Examiner—Stephen P. Garbe
Attorney, Agent, or Firm—Harness, Dickey & Pierce

[57] ABSTRACT

A coupon organizer is provided which allows for easy access to coupons by a shopper. The coupon organizer includes fastening means for maintaining the organizer in a open and operative position and means for maintaining the organizer in a closed position to store and transport the coupons.

11 Claims, 2 Drawing Sheets

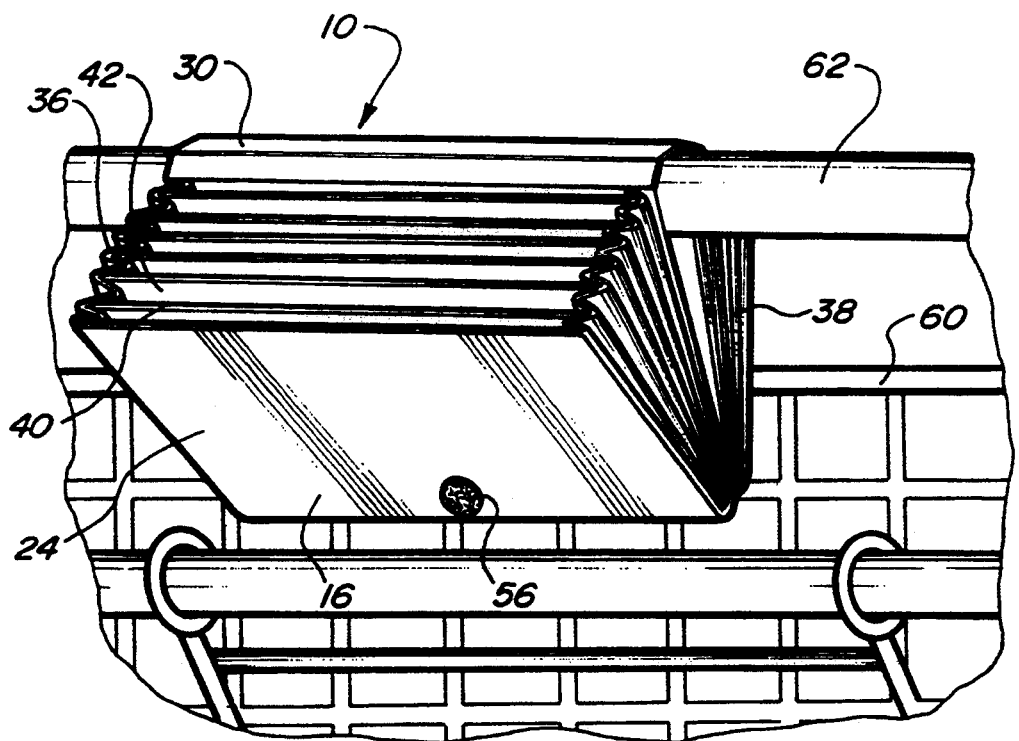
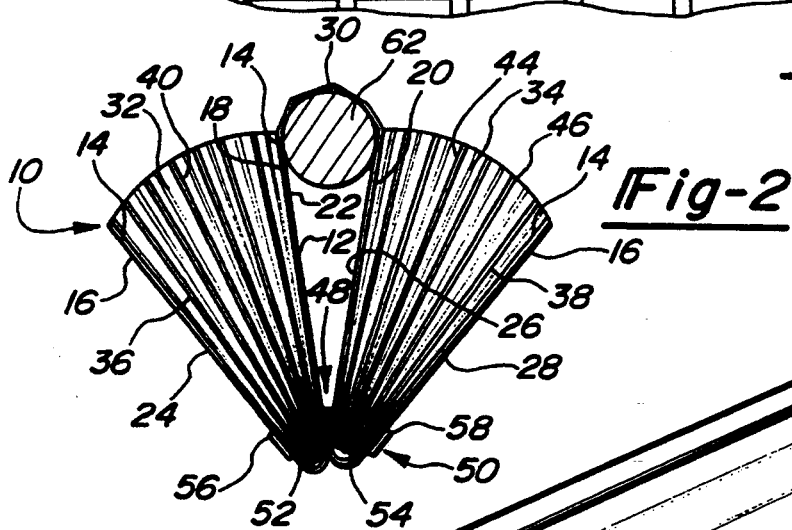
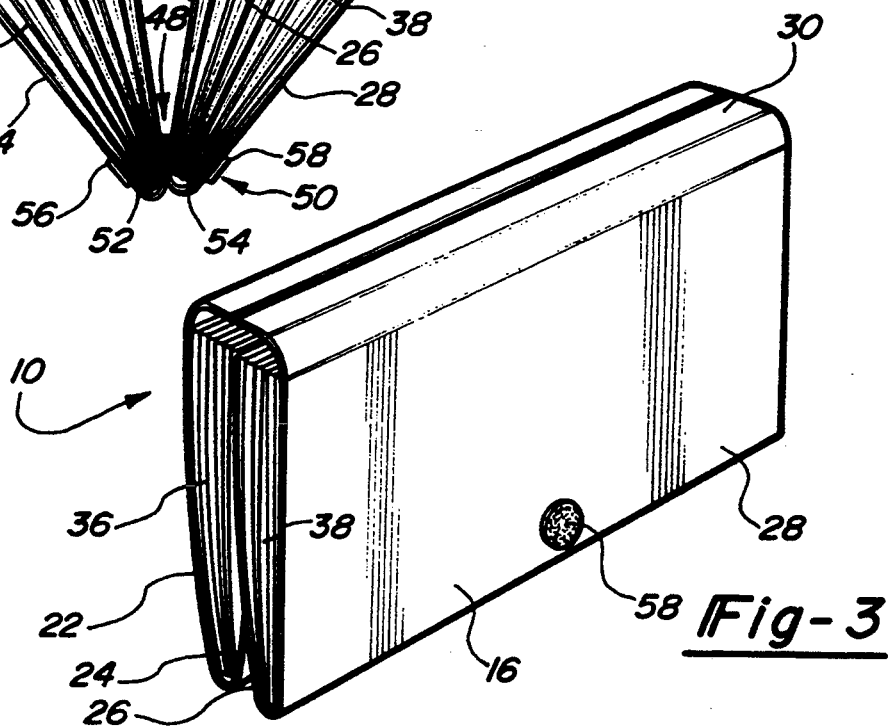

COUPON ORGANIZER

FIELD OF THE INVENTION

The present invention relates to a coupon organizer, and more particularly to a coupon organizer adapted to provide access to a plurality of sections for indexing coupons and which is foldable into a compact wallet for storage and transportation.

BACKGROUND OF THE INVENTION

Individuals in the market for a variety of products often utilize coupons which are redeemable for discounts on selected items. Coupons are generally offered by retailers, and particularly grocery stores and supermarkets, to offer discounts to shoppers possessing and presenting coupons at the time of making a purchase. Typically, coupons come in the form of paper products and include a description of the merchandise and a numerical denomination designated on the face of the coupon which is indicative of the discount provided for the specific item.

Over time, shoppers can experience great savings through the use of coupons. Indeed, many consumers accumulate hundreds and even thousands of coupons by removing them from printed media such as newspapers, magazines, packaging materials, brochures and advertisements received through the mail. The widespread use of coupons has lead to the need for products which assist in the organization and further assist in the storage and transportation of coupons which are typically collected and gathered at home and taken to the grocery stores and supermarkets.

Most prior art devices which are intended to assist the shopper in organizing and transposing coupons include structures incorporating inflexible components such as pivot pins, mounting structures, support structures, writing tablets and the like. Such prior art devices offer limited flexibility and therefore tend to be difficult to attach and detach from shopping carts. Worse yet, many of the known devices require multiple clamps or other fasteners to attach the device to a shopping cart.

Further, the known prior art devices offer limited accessibility to the coupons during the shopping experience. For example, many of the known prior art devices include a plurality of flaps or lids which need to be manipulated to gain access to the coupons. Each flap or lid typically includes one or more fasteners which must be released prior to manipulating the flaps or lids to gain access to the coupons. The flaps or lids often continue to cover at least a potion of the coupon containment area even after being manipulated thus limiting access to the coupons unless the flaps or lids are held out of the way by the shopper.

Yet another problem with many of the known prior art devices is the bulky nature of the device. Many of the known coupon retainers are too large to conveniently transport from home to the grocery store or supermarket. This is especially true if multiple locations are to be visited during a single shopping experience.

While numerous prior art devices are intended to assist the shopper in organizing and transporting coupons from the home to the grocery stores and supermarkets, none of the known devices truly are adapted to provide easy access to the coupons while shopping and ready closure, storage and transportation during periods of non-use.

SUMMARY OF THE INVENTION

The present invention provides quick and easy access to the coupons while shopping and means for storing and transporting the coupons during periods of non-use. The coupon organizer of the present invention includes a generally symmetrical structure having a pair of spaced apart extendable envelopes disposed along the inner surface of the structure. Each envelope includes accordion-like side walls having dividers extending therebetween to separate the envelopes into a plurality of pockets. The envelopes are separated by a selectively reversible hinge which allows the envelopes to be accessed while draped over the handle of a shopping cart in a saddlebag-like arrangement. The coupon organizer can be secured in the operative position over the handle of a shopping cart or closed to a wallet-shaped article when the envelopes are positioned together to expose the outer surface of the coupon organizer.

One advantage of the present invention is the ready access to the envelopes containing the coupons. Another advantage of the present invention is the compactness and transportability of the coupon organizer. A further advantage is quick and easy mounting and dismounting onto a shopping cart or other carrier. Yet another feature of the present invention is the decorative appearance.

BRIEF DESCRIPTION OF THE DRAWINGS

Other features and advantages of the present invention will become apparent from the following description and appended claims, taken in conjunction with the accompanying drawings in which:

FIG. 1 is a perspective view of the coupon organizer according to the teachings of the present invention attached to the handle of the shopping cart;

FIG. 2 is a side cross-sectional view of the coupon organizer of FIG. 1;

FIG. 3 is a perspective view of the coupon organizer shown in a folded position for transportation and storage;

DETAILED DESCRIPTION OF THE PREFERRED EMBODIMENT

Figure 4:
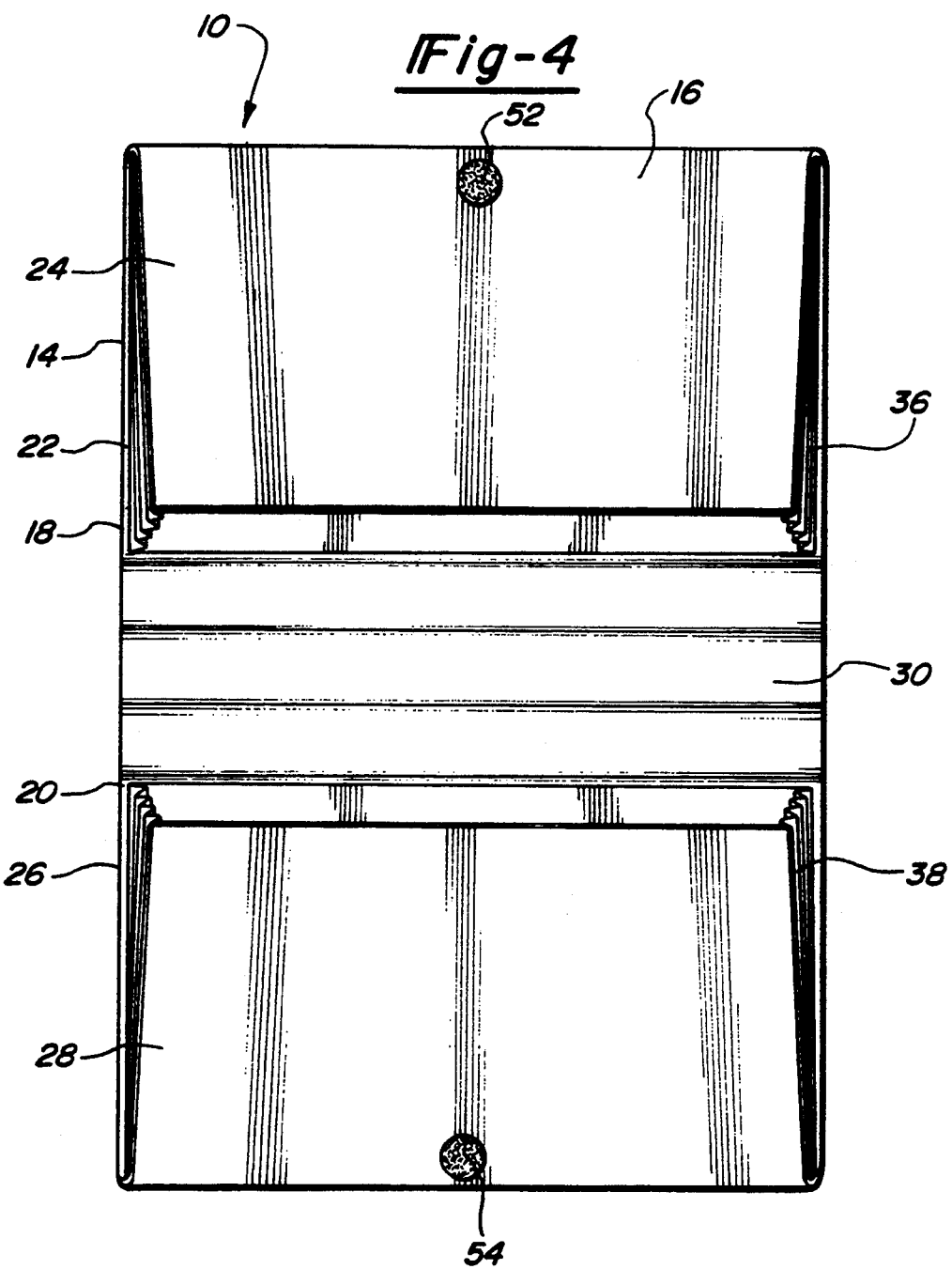
FIG. 4 is a top view of the coupon organizer shown in an extended position.
Figure 5:
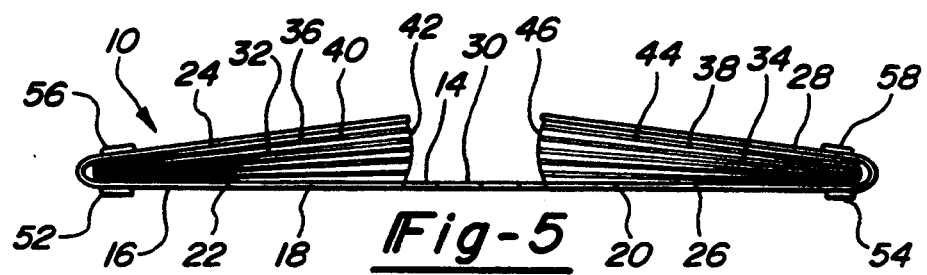
FIG. 5 is a side elevation view of the coupon organizer shown in an extended position.

As depicted generally in FIGS. 1 through 5 the coupon organizer 10 of the present invention is adapted to be temporarily mounted to the handle 62 of a shopping cart 60 as shown in FIG. 1. The coupon organizer 10 hangs vertically downwardly from the shopping cart handle 62 such that the coupons can be easily accessed by the shopper. The coupon organizer 10 according to the teachings of the present invention includes a base 12 having inner and outer surfaces 14 and 16, respectively. The base 12 is preferably divided into first and second panels 18 and 20, which are divisible into sections. The first panel 18 includes a first section 22 and a second section 24 extending from the first section. Likewise, the second panel 20 includes a first section 26 and a second section 28 extending from the first section 26. Preferably, both the first and second panels 18 and 20 will be substantially symmetrical so that when the panels are folded together along the inner or outer surfaces 14 and 16 the length and width of both the first and second panels are essentially limited to the overall structure of a single panel. The first and second panels 18 and 20 are joined along the midsection by a selectively reversible hinge 30. The hinge 30, which preferably is an integral portion of the base 12, is sufficiently flexible so as to allow the panels to be fastened together along the corresponding first sections 22 and 26 or the corresponding second sections 24 and 28, respectively.

The base 12 may be formed from a variety of flexible materials including, but not limited to, cloth, leather, flexible plastics, paper and the like and combinations thereof. Additionally, the outer surface 16 of the base 12 may include decorative patterns or designs which are adhered, sewn, imprinted, painted or otherwise incorporated as desired to further enhance the overall appearance of the coupon organizer 10.

Both panels 18 and 20, are provided with extendable envelopes 32 and 34, respectively, for receiving the coupons (not shown). The first extendable envelope 32 includes a pair of spaced apart accordion-like side walls 36 which extend from the inner surface 14 between the first and second sections 22 and 24 of the first panel 18. A plurality of dividers 40 are inserted into the envelope 32 or are integrally attached between the side walls 36 to provide a plurality of pockets 42 for indexing the coupons according to the desired system for indexing. For example, the dividers can be labeled or color coded to denote a specific category of coupons such as "cookies/crackers", "juices/soft drinks", "milk", "frozen dairy products", etc. Preferably, the dividers 40 and 44 will include projecting tabs (not shown) which provide means for quickly accessing the desired pocket.

Likewise, the second extendable envelope 34 includes accordion side walls 38 having dividers 44 inserted therein or integrally formed therewith to separate the envelope 34 into a plurality of pockets 46 for indexing the coupons. The number of pockets formed within the envelopes can be varied depending mainly upon the number of coupons to be stored. Preferably, the side walls 36 and 38 will have limited expendability to assist in maintaining the coupons (not shown) in a substantially upright position.

As noted, the coupon organizer 10 is designed to flex about the reversible hinge 30 to open or close the structure as desired. To assist in maintaining the coupon organizer 10 in an open, operative position fastening means 48 are provided. The fastening means 48 include mating fasteners 52 and 54 disposed along the outer surface 16 of the corresponding first sections 22 and 26, respectively. Also provided for maintaining the coupon organizer 10 in a closed position are fastening means 50. Fastening means 50 include mating fasteners 56 and 58 which are provided on the outer surface 16 along the second sections 24 and 28, respectively. Preferably, the complementary sets of fasteners 52 and 54; and 56 and 58 will be of the hook and loop variety such as VELCRO ®. It should be understood however that other fastening means such as buttons, snaps, studs and tacky adhesives may be utilized according to the teachings of the present invention.

The operative aspects of the coupon organizer 10 according to the teachings of the present invention will now be described in greater detail. Referring to FIGS. 1 and 2, the coupon organizer 10 is shown in its open, operative position mounted over the handle 62 of a shopping cart 60. The coupon organizer 10 is positioned such that the reversible hinge 30 is draped substantially contiguously over the handle 62 of the shopping cart 60 along the outer surface 16. Once the coupon organizer 10 has been positioned over the shopping cart handle 62 the first sections 22 and 26 of the first and second panels 18 and 20, respectively, are brought together and the fastening means 48 are joined to secure the coupon organizer 10 in the open, operative position. As the first sections 22 and 26 are brought together to connect the fastening means 48, the envelopes 32 and 34 tend to swing open at the top to provide unincumbered access to the envelopes. In this position the envelopes 32 and 34 are accessible to the shopper for inserting and retrieving coupons. Preferably, slack is provided in the reversible hinge 30 to allow the coupon organizer to suspend substantially vertically downwardly much like a saddlebag is suspended from a horse or mule.

Once the shopper has finished shopping the coupon organizer 10 can be removed from the shopping cart 60 and closed to securely retain the coupons. To remove the coupon organizer 10 from the shopping cart 60 the first sections 22 and 24 of the first and second panels 18 and 20 are separated by releasing the fastening means 48. After releasing the fastening means 48 the coupon organizer 10 is lifted away from the handle 62 of the shopping cart 60. To close the coupon organizer 10 the first and second panels 18 and 20 are rotated approximately 180° via the reversible hinge 30 such that the envelopes 32 and 34 are disposed adjacent each other along the second sections 24 and 28. Upon bringing the envelopes together the fastening means 50 are connected to secure the coupon organizer 10 in a closed position.

By folding the first and second panels 18 and 20 together such that the envelopes are positioned adjacent each other, the coupon organizer 10 takes on the overall appearance of a wallet and can now be stored within a purse and transported as desired.

While the preferred embodiment as disclosed herein is adapted for use in conjunction with a grocery shopping cart, it will be appreciated that there may be a number of additional applications in which the coupon organizer can be utilized. Thus, one could exercise ordinary skill in the art to adapted the invention disclosed herein to fit the needs of a particular situation without departing from the spirit or scope of the invention disclosed herein.

The foregoing discussion discloses and describes merely exemplary embodiments of the present invention. One skilled in the art will readily recognize from such discussion, and from the accompanying drawings and claims, that changes, modifications and variations can be made therein without departing from the spirit and scope of the invention as defined in the following claims.

What is claimed is:

1. A reversible coupon organizer, comprising:
a base having an inner surface and an outer surface;
first and second panels separated by a selectively reversible hinge, said first and second panels including an extendable envelope disposed along said inner surface, said envelope having accordion side walls and at least one divider extending between said side walls to thereby form pockets for receiving coupons;
fastening means for maintaining said coupon organizer in an open, operative position; and
fastening means for maintaining said coupon organizer in a closed position.

2. The reversible coupon organizer of claim 1, wherein said first and second panels include first and second sections.

3. The reversible coupon organizer of claim 2, wherein said fastening means for maintaining said coupon organizer in an open, operative position further comprises a first fastener disposed on the first section of said first panel and a mating second fastener disposed on the first surface of said second panel.

4. The reversible coupon organizer of claim 3, wherein said fastening means include mating hook and loop type fasteners.

5. The reversible coupon organizer of claim 2, wherein said fastening means for maintaining said coupon organizer in a closed position further comprises a first fastener disposed on the second section of said first panel and a mating second fastener disposed on the second section of said second panel.

6. The reversible coupon organizer of claim 5, wherein said fastening means include mating hook and loop type fasteners.

7. The reversible coupon organizer of claim 1, wherein said base is made from a material selected from the group consisting of cloth, leather, flexible plastics and paper.

8. A reversible coupon organizer, comprising:
a base having an inner surface and an outer surface, said base including first and second panels separated by a selectively reversible hinge, said first panel including first and second sections and an extendable envelope extending between said first and second sections, said second panel including first and second sections and an extendable envelope extending between said first and second sections, wherein at least one of said extendable envelopes includes accordion side walls having at least one divider extending therebetween to thereby form pockets for receiving coupons;

fastening means for maintaining said coupon organizer in an open operative position, said means including mating fasteners disposed along the outer surface of the corresponding first sections of said first and second panels; and fastening means for maintaining said coupon organizer in a closed position, said means including mating fasteners disposed along the outer surface of the corresponding second sections of said first and second panels.

9. The reversible coupon organizer of claim 8, wherein said fastening means for maintaining said coupon organizer in an open, operative position further comprise mating hook and loop type fasteners.

10. The reversible coupon organizer of claim 9, wherein said base is made from a material selected from the group consisting of cloth, leather, flexible plastics and paper.

11. The reversible coupon organizer of claim 8, wherein said fastening means for maintaining said coupon organizer in a closed position further comprise mating hook and loop type fasteners.

* * * * *

UNITED STATES PATENT AND TRADEMARK OFFICE
CERTIFICATE OF CORRECTION

PATENT NO. : 5,387,037
DATED : 02/07/95
INVENTOR(S) : Benerly Daitch

It is certified that error appears in the above-indentified patent and that said Letters Patent is hereby corrected as shown below:

Column 1, line 52                      "potion" should be -- portion--

Signed and Sealed this

Twentieth Day of June, 1995

Attest:

BRUCE LEHMAN

*Attesting Officer*        *Commissioner of Patents and Trademarks*